April 13, 1954 L. R. HEIM 2,675,281
SELF-ALIGNING BEARING
Filed Aug. 26, 1948
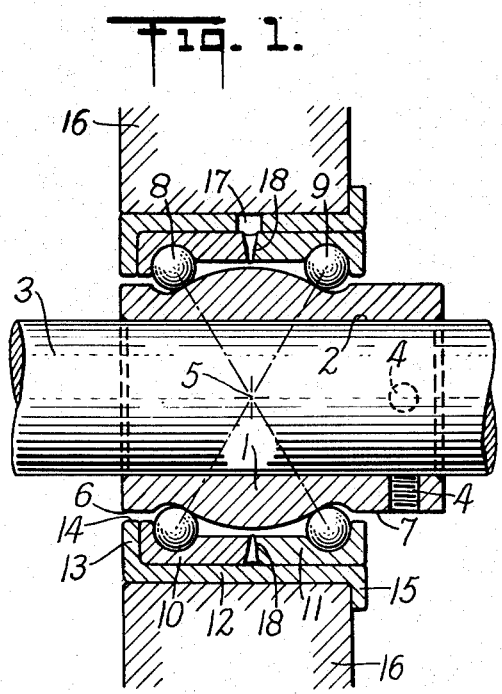
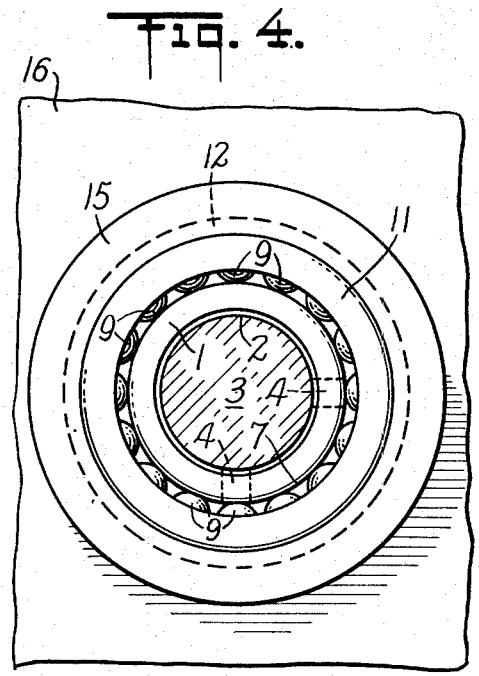
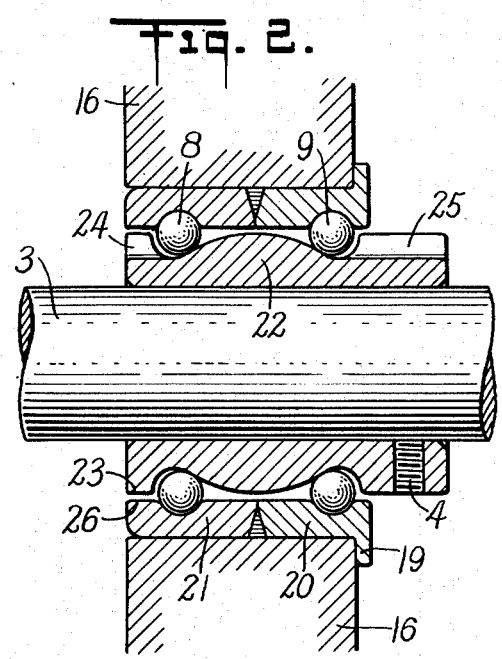
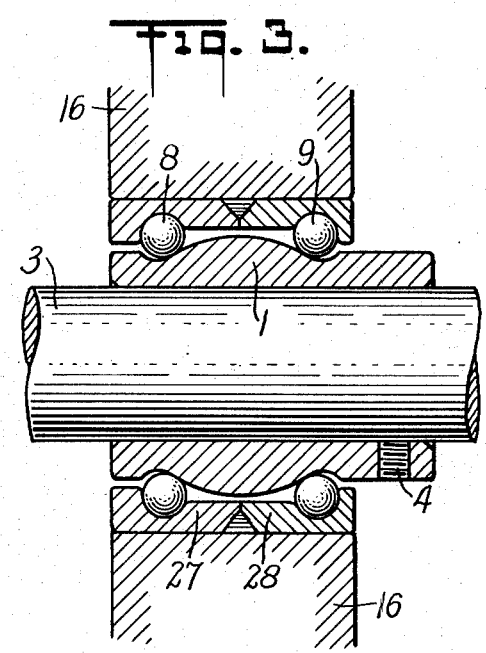
INVENTOR
Lewis R. Heim
BY
Blair, Curtis & Hayward
ATTORNEYS Patented Apr. 13, 1954

2,675,281

UNITED STATES PATENT OFFICE 2,675,281

SELF-ALIGNING BEARING

Lewis R. Heim, Fairfield, Conn.

Application August 26, 1948, Serial No. 46,194

1 Claim. (Cl. 308—194)

This invention relates to bearings of the self-aligning type. One of the objects thereof is to provide a simple and practical bearing of the above nature adapted for efficient action in use. Another object is to provide a bearing of the above type of rugged construction adapted to stand the hardest use and yet to be characterized by a high degree of precision in action. Another object is to provide a bearing of the above type adapted to withstand not only the radial stresses, but also to some extent adapted to withstand stresses applied in a thrust or substantial axial direction. Another object is to provide a method or art for assembling the parts of the bearing which will be characterized by rapid action and dependable results. Other objects will be in part obvious and in part pointed out hereinafter.

The invention, accordingly, consists in the features of construction, combinations of elements and arrangement of parts, and in the method of construction and assembly, all as illustratively set forth in the following description and claimed in the appended claim.

Referring now to the drawing in which are illustratively shown one or more of various possible embodiments of the mechanical features of this invention:

Figure 1 is a sectional view of the bearing and related parts;

Figure 2 is a similar view along the lines of Figure 1 and having many of its characteristics, but of a somewhat simpler type;

Figure 3 is a similar view of another variation of the bearing, also of a relatively simple type; and Figure 4 is an end view of the bearing shown in Figure 1.

Similar reference characters refer to similar parts throughout the several views of the drawing.

Referring now to the drawing in detail, there is shown in Figure 1 an inner race member 1, formed of steel or other suitable metal and provided with a bore 2 through which a shaft 3 is inserted. The shaft may be held in position within inner race 1 by means of set screws or pins through suitable holes as shown at 4.

The inner race 1 will be seen in this longitudinal section as shaped to provide an outer convex surface which has a curvature at all points of an equal radius with respect to a point on the longitudinal center of the bore, as indicated at 5. This convex outer surface of the inner race-way is spherical with respect to the above point 5.

At each end of the above spherical surface the outer surface of the race-way turns outwardly, that is in a direction away from the axis, and terminates in cylindrical surfaces as shown at 6 and 7.

Resting upon the above spherical surface is a pair of sets of balls 8 and 9, which respectively extend about the spherical surface in two planes transverse to the axis of the part 1 and preferably sufficient in size and number each to form a complete set of balls in close proximity one with the other.

The outer race-ways for these two sets of balls are respectively formed in a pair of outer rings 10 and 11, the parts being so shaped and proportioned that a line passing through the two points of contact with the respective race-ways would pass through the central point 5, as indicated in dotted lines. With the parts in position for use the two rings 10 and 11 are of the same inner and outer diameter and are welded together so as to behave as a single ring or sleeve providing bearing surfaces or race-ways for the balls as before set forth.

In this construction the rings 10 and 11 are forced into a cylindrical sleeve 12 by a force fit so as to remain in position within the part 12. One end of the part 12 is flanged inwardly as shown at 13 to provide a surface at 14, substantially opposite the surface 6 of the inner raceway, and to serve as a terminal or stop against which the race-ways 10 and 11 are forced. At the opposite end of the part 12 there is provided an outwardly extending flange 15 which rests against the outer surface of a supporting member 16. This part 16 may be in the form of a hanger or a part of the frame of a machine and its bore is of such size that when the flanged member 12 is forced into the position shown it is held there by what is substantially a pressed fit.

Referring briefly to the construction thus far described, the outer sleeve or housing 12 acts as a dependable support for the bearing and this bearing is held in the position shown against displacement under conditions of hardest use. If the alignment of the shaft 3 is at variance with the alignment of the outer support, the inner race is free to swing in rolling engagement with the two sets of balls and without disturbing either the outer parts or the relation of the outer race-ways to the inner race-ways. The latter simply swing about the point 5 as hereinbefore described.

Although the bearing is primarily intended to resist radial stresses in use, irrespective of the misalignment of the inner shaft, nevertheless it will resist axial thrust stresses to a substantial extent due to the conical displacement of the lines of contact between the inner and outer bearing points, as indicated in the dotted lines hereinbefore described.

For purposes of lubrication there is provided a hole 17 through the sleeve or housing 12 and holes are provided through the junction points 18 so as to pass the lubricant inwardly on to the spherical surface of the inner bearing over which the lubricant works its way to the respective races and balls.

It is to be noted that in the foregoing manner the displaced or non-aligning shaft is accommodated without any stress upon the balls or the outer race-ways, the latter acting precisely as they would if the inner shaft were in axial alignment with the outer portions of the bearing.

Turning now to the method of assembly of the foregoing apparatus, it being understood that neither the shaft 3 nor the outer supporting member 16 is concerned, the ring 11 is temporarily supported with its axis in a preferably vertical position. The race-way of that ring is then greased with a suitable grease or the like and the entire complement of balls is fitted into the race-way and held in such position against rolling out by gravity. The inner race member 1 is then, with its axis vertical, passed downwardly over these balls 9, it being understood that the diameters of this member at the points 6 and 7 are such as to permit this inner member to be passed downwardly into the position shown in Figure 1 of the drawings.

The next step is to fit a complement of balls 8 within the race-way of ring 10, using any suitable means such as heavy grease or the like to hold them temporarily in position as before explained and this ring with the balls in position is then passed down over the upper end of the inner member at the surface 6. The parts will then be in the assembled position shown and if desired the meeting ends of 10 and 11 are welded together. However, in this case the outer sleeve 12 is forced over these two members with a fit tight enough to form a press fit and when this is accomplished the entire device is ready for use.

It is to be understood that the number and size of the balls used in each race-way is such that each set of balls forms a complete complement without the necessity for other devices and the contact of these balls with each ring is along a line so as to lessen the friction of rotation.

With the parts brought into this position the two race-ways are widely spaced one from the other so as to permit each to exert its full effect in supporting the inner race-way and also there is avoided the weaknesses attendant on the use of staggered balls and the use of spacers.

The compactness and strength of the construction will be obvious and it also will be seen that no side plates are required.

Referring now to the simpler construction shown in Figure 2 of the drawings, it will be seen that the outer flanged sleeve 12, the construction first described, is dispensed with, the flange 19 being formed directly on the ring member 20 and the member 21 being lengthened to bring its endwise surface substantially into registry with the inner end and inner race-way 22 as shown at 23. In this form the meeting ends of the parts 20 and 21 are welded together so as to form in effect a single member and, when forced within the bore of the supporting part, is dependably held in position without the corresponding outer parts in the construction described in Figure 1.

There may be provided in this form of bearing a pair of insertion grooves 24 and 25, so as to facilitate the assembling of the parts by rolling the balls through the grooves instead of passing them over the outer circular surfaces 6 and 7 of Figure 1 as before described. One groove is, of course, sufficient for each set of balls, the former being sufficiently wide for the balls to pass through them and the remainder of these outer portions of the inner member forming a flange, as shown, of such diameter as to more effectively close the openings between the inner and outer races.

The flange 19 acts in the same general manner as the corresponding part in the bearing first described.

In Figure 3 is shown a form of bearing which is even more simplified by the absence not only of the outermost housing 12 and flange 15 of the bearing of Figure 1, but it also dispenses with the insertion grooves cut at the two ends of the inner race-way as shown and described with respect to bearing of Figure 2. Even this relatively simple bearing possesses many of the features of ruggedness and accuracy of action of those earlier described. The outer race member 27, rigidly welded together at 28, is forced into the bore of the support.

It will thus be seen that there are provided constructions in which the several objects of this invention are achieved.

As various possible embodiments of the several features of this invention may be made and as the embodiments shown may be substantially altered, all without departing from the scope of the invention, it is intended that all matter herein shown or described shall be broadly construed as illustrative and not in a limiting sense.

I claim:

In a self-aligning bearing, in combination, a casing having an inwardly directed flange at one end and an outwardly directed flange at its opposite end, a pair of race-way rings tightly fitted within said casing, one of said rings abutting said inwardly directed flange, an inner race-way member having an outer surface of spherical form, each of said rings having a race-way groove formed therein, and a pair of sets of balls extending about said grooves in planes transverse to the axis of said inner race-way member and in contact with said spherical surface.

References Cited in the file of this patent

UNITED STATES PATENTS

| Number | Name | Date |
|---|---|---|
| 526,013 | Howard | Sept. 11, 1894 |
| 1,307,799 | Wingquist | June 24, 1919 |
| 1,439,486 | Schmidt | Dec. 19, 1922 |
| 1,902,662 | Phelps | Mar. 21, 1933 |
| 1,914,928 | Scott | June 20, 1933 |
| 1,947,004 | Goddard | Feb. 13, 1934 |
| 2,149,983 | Smith | Mar. 7, 1939 |
| 2,256,783 | Pigott | Sept. 23, 1941 |
| 2,259,881 | Foley | Oct. 21, 1941 |
| 2,330,741 | Potter | Sept. 28, 1943 |

FOREIGN PATENTS

| Number | Country | Date |
|---|---|---|
| 29,275 | Great Britain | 1904 |
| 73,533 | Australia | July 10, 1917 |
| 443,710 | France | Oct. 1, 1912 |
| 451,402 | France | Apr. 18, 1913 |